United States Patent
Christensen et al.

(10) Patent No.: US 6,720,916 B2
(45) Date of Patent: Apr. 13, 2004

(54) APPARATUS AND METHOD FOR PERFORMING OPEN LOOP TRACKING OF A SIGNAL

(75) Inventors: Jacob Christensen, Kungsbacka (SE); Manfred Sust, Vienna (AT); Magnus Bonnedal, Partille (SE); Anders Carlström, Mölnlycke (SE)

(73) Assignee: Saab Ericsson Space AB (SE)

( * ) Notice: Subject to any disclaimer, the term of this patent is extended or adjusted under 35 U.S.C. 154(b) by 10 days.

(21) Appl. No.: 10/101,195

(22) Filed: Mar. 19, 2002

(65) Prior Publication Data

US 2002/0158794 A1 Oct. 31, 2002

(30) Foreign Application Priority Data

Mar. 19, 2001 (SE) ................................. 0100975

(51) Int. Cl.$^7$ ............................................. H04B 7/185
(52) U.S. Cl. ................................................ 342/357.05
(58) Field of Search ....................... 342/357.01, 357.05, 342/357.06, 357.07; 701/213, 215

(56) References Cited

U.S. PATENT DOCUMENTS 5,805,200 A * 9/1998 Counselman ................ 342/357
5,995,040 A * 11/1999 Issler et al. .................. 342/352
6,313,789 B1 * 11/2001 Zhodzishsky et al. . 342/357.12

* cited by examiner

*Primary Examiner*—Dao Phan
(74) *Attorney, Agent, or Firm*—Lerner, David, Littenberg, Krumholz & Mentlik, LLP

(57) ABSTRACT

A radio occultation instrumentation system includes a first satellite arranged with a transmitter for transmitting a signal with a carrier frequency and a second satellite arranged with a receiver for receiving the signal. The receiver receives information I(x,v) regarding the position and velocity of the first and second satellite and provides a prediction of the Doppler shift displacement of the carrier frequency of the signal for use in tracking the signal. The predicted Doppler shift displacement is also used to determine atmospheric conditions.

8 Claims, 3 Drawing Sheets

Model for NRIPA as a function of SLTA.

APPARATUS AND METHOD FOR PERFORMING OPEN LOOP TRACKING OF A SIGNAL

BACKGROUND OF THE INVENTION

The invention relates generally to a radio occultation instrumentation system and, more particularly, to open loop tracking of low altitude signals.

Radio Occultation instruments using Global Navigation Satellite System (GNSS) signals are space borne receivers, which provide information, regarding the Doppler shift of signals transmitted from, for instance, a Global Positioning System (GPS) satellite having a well defined position in a well-defined orbit and a transmitter with a well-defined frequency. The signal from the GPS satellite is received, after having crossed the atmosphere, by a receiver at a Low Earth Orbiting satellite. The Doppler shift of the received signal is measured and from this measurement, vertical profiles of the temperature, pressure and density in the atmosphere can be derived. Thus, the basic function of a Radio Occultation instrument is to receive and acquire signals that have crossed the atmosphere at varying altitudes, even if such signals have crossed dense tropospheric layers, which often have large refractivity causing dynamics in amplitude and phase of the signal.

GNSS radio Occultation as an atmospheric sensing tool has advantages regarding all weather capability because clouds do not block the signals. The method provides for high vertical resolution from 1.5 km in the stratosphere to 0.2 km in the troposphere. The accuracy of the retrieved temperature is in the range of 1K. Furthermore the method provides for long-term consistency, which is essential for climate change monitoring.

An illustration of the use of Radio Occultation with respect to a setting satellite is described below with reference to FIG. 1.

An instrument, e.g., in satellite 3 (the setting satellite), acquires and tracks a transmitted GPS signal from satellite 2 at two frequencies L1 and L2. The transmitted signal is represented by a ray path 1 from the satellite 2 to the low earth orbiting satellite 3 and, initially, does not pass the upper parts of the atmosphere. This position is indicated with P1 in FIG. 1. When the ray path 1 descends into the atmosphere, the instrument measures the carrier phase and the Doppler shift is calculated from the measured carrier. The phase measurements are transmitted from satellite 3 to a receiving station 4 positioned on the earth. The Doppler shift recorded together with information regarding the position and the velocity of the satellites is used for determining the directions of the reception and transmission. The position of the satellite 2 carrying the transmitter is denoted by $x_G$ and the position of the low earth orbiting satellite 3 is denoted by $x_L$, where $x_G$ and $x_L$ are vectors. A further vector x is defined as the positions of both satellites, that is $x=(x_G, x_L)$. Turning briefly to FIG. 2, illustrations of ray geometry are shown. In the case of a spherically symmetric atmosphere the central part of the ray path, that is a portion 5 of the ray path around the point where the distance to the earth is at a minimum, is symmetric. Therefore the distances, known as impact parameters a, from the earth centre to ray asymptotes 6,7 at the respective impact point 8,9 are equal. The impact points 8,9 are situated on the ray path 1 where a plane perpendicularly arranged to a ray asymptote 6,7 passes through the centre of the earth. Furthermore the ray asymptotes cross each other at an angle α, which is defined as the refraction angle. The impact parameters a, and the refraction angle α, can be calculated from the Doppler shift using only measurement geometry. Thus, the refraction angle α can be derived as a function of the impact parameter. When performing measurements, the dispersive behaviour of the ionosphere and the non-dispersive behaviour of the neutral atmosphere is used to enable determination of the refraction angle contribution from each of these layers. Further, use of the symmetric atmosphere condition allows for determination of the refraction index profile α(r) as a function of the earth radius from the refraction angle α by using the Abel transform. The refraction index profile α(r) depends on the air pressure, temperature and water vapour content, which parameters are retrieved using the gas equation and the hydrostatic equilibrium equation.

A more detailed presentation of how radio occultation is performed is provided in P. Hoeg et al., "*The Derivation of Atmospheric Properties by Radio Occultation*", Danish Meteorological Report 95-4, 1994, E. R. Kursinsky et al., "*Observing Earth's Atmosphere with radio Occultation Measurements using the GPS*", Journal of Geophysical research, 102, no. D19 Oct. 1997, W. G. Melbourne et al., "*The Application of Spaceborne GPS to Atmospheric Limb Sounding and Global Change Monitoring*", JPL Publication 94-18, 1994 and C. Rocken et al., "*Analysis and validation of GPS/MET Data in the Neutral Atmosphere*", Journal of Geophysical Research, 1998, which all are incorporated by reference.

At high altitudes, where the signal is strong, the receiver locks on to the signal carrier. However, as the ray path transverses the atmosphere at lower altitudes, the ray is gradually more bent, attenuated and spread, due to the increase in refractivity. Consequently, tracking can sometimes not be performed at the lower altitudes, where the signal is weak and has large dynamic properties. Therefore, there is a need for an aided tracking that is model based. While, attempts have been made to perform model based tracking, the suggested methods have difficulties with the atmospheric Doppler shift at the lowest altitudes. This has resulted in loss of signal or inaccuracies in the measurement results for low altitudes (altitudes less than 5 km above the surface of the earth).

SUMMARY OF THE INVENTION

An object of the invention is to provide apparatus for performing open loop tracking of a signal in a radio occultation instrumentation system, where the effects of the large variation of the atmospheric Doppler shift at low altitudes are mitigated. Therefore, and in accordance with the invention, a satellite receiver tracks a received signal by predicting a Doppler shift displacement of the received signal as a function of the distance of an impact point a relative to the earth, the positions of a first and a second satellite and the velocity of the first and the second satellite.

In an illustrative embodiment of the invention, a satellite receiver comprises a frequency control unit and a means providing parametric value Q(x,v,α(x)), which corresponds to Doppler shift displacement. The parametric value Q(x,v, α(x)) asymptotically converges towards a function F(x,v) dependent on the satellite positions and velocities and independent of atmosphere conditions when a ray path leaves the atmosphere, and asymptotically towards a fixed value when the ray path approaches the surface of the earth, wherein the parametric value is arranged for providing signal acquisition by the frequency control unit.

In another embodiment of the invention, the above-described Doppler shift displacement is used in a method for determining atmospheric conditions.

In particularly preferred embodiments a straight-line tangential altitude (SLTA) is used as a basis for the calculation of the parametric value. This is particularly advantageous since the SLTA continues to decrease to large negative numbers when the impact altitude asymptotically converges to a constant value at low impact altitudes, and thereby the effects of a large variation in atmospheric Doppler can be compensated.

BRIEF DESCRIPTION OF THE DRAWINGS

An embodiment of the invention will be described in further detail together with references to appended figures, where.

DETAILED DESCRIPTION

Figure 1:
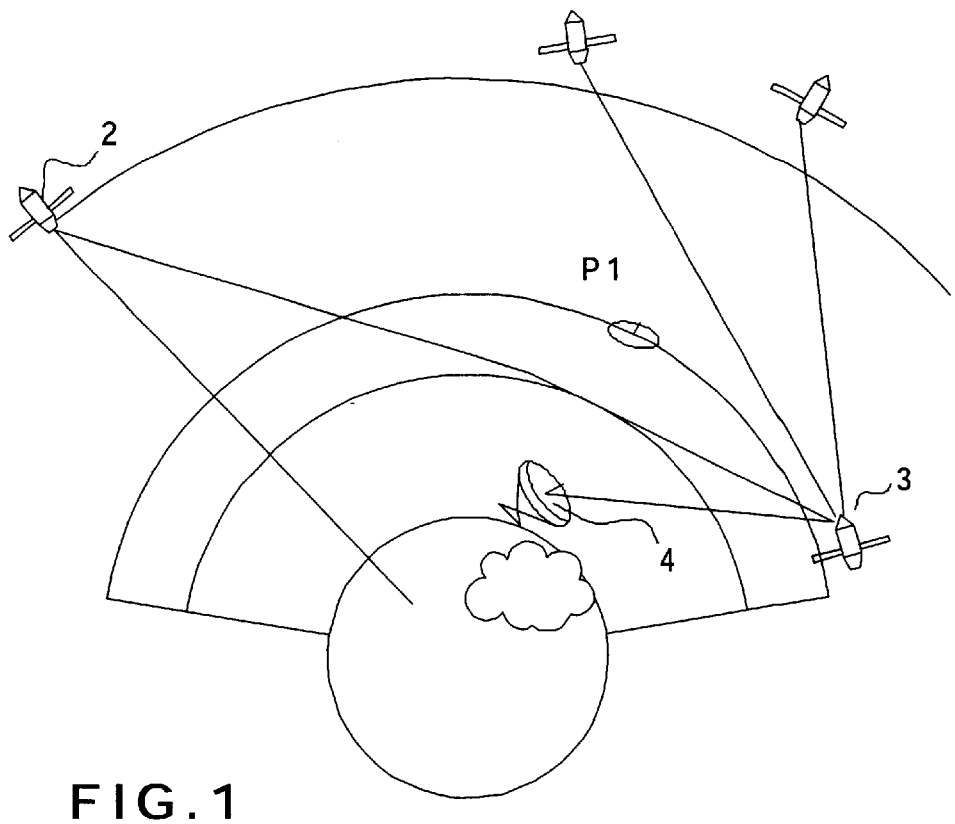
FIG. 1 shows an outline of a radio occultation instrumentation system.

In FIG. 1 a radio occultation instrumentation system is shown. The system includes a first satellite 2 arranged with a transmitting means arranged for transmitting a signal with well defined carrier frequency, and a second satellite 3 arranged with signal receiving means receiving the transmitted signal, wherein the transmitted signal has an associated ray path 1 from the first satellite 2 to the second satellite 3 which descends into and ascends from the atmosphere 12. The first satellite 2 is preferably a GPS satellite having a well-defined position in a well-defined orbit around the earth. For detailed information about GPS systems see, e.g., E. D Kaplan, "*Understanding GPS—Principles and Applications*", Artech House 1996. Furthermore the frequencies of the transmitting means are well defined. In a practical existing system, these frequencies are 1.227 and 1.575 GHz, but other frequencies could be used. The second satellite 3 is preferably a low earth orbiting satellite. This second satellite 3 receives the signal transmitted from the first satellite 2 and measures the Doppler shift displacement of the signal. Information regarding the Doppler shift displacement is then transmitted to a receiving station 4 positioned on ground. The signal is further processed on the ground in order to determine atmospheric conditions such a temperature, density and pressure as a function of the altitude.

Other than the inventive concept, radio occultation systems and its general apparatus included in such systems are known to the skilled man in the art, for example through P. Hoeg et al., "*The Derivation of Atmospheric Properties by Radio Occultation*", Danish Meteorological Report 95-4, 1994, E. R. Kursinsky et al., "*Observing Earth's Atmosphere with radio Occultation Measurements using the GPS*", Journal of Geophysical research, 102, no. D19 Oct. 1997, W. G. Melbourne et al., "*The Application of Spaceborne GPS to Atmospheric Limb Sounding and Global Change Monitoring*", JPL Publication 94-18, 1994 and C. Rocken et al., "*Analysis and validation of GPS/MET Data in the Neutral Atmosphere*", Journal of Geophysical Research, 1998, and will therefore not be described further herein.

Figure 2:
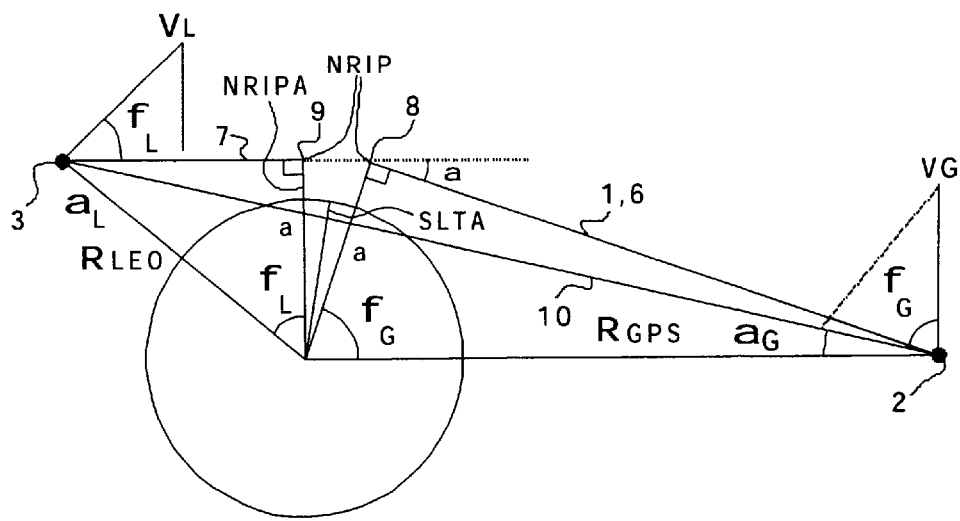
FIG. 2 shows definitions of the ray geometry.

Turning now to FIG. 2, at high altitudes, that is when a ray path between satellite 2 and satellite 3 does not pass through the atmosphere, the signal received by satellite 3 is strong. As such, the receiver of satellite 3 locks on to the carrier frequency of the signal and phase locked loop tracking of the carrier is performed. (The second satellite 3 is provided with a system for Phase lock loops for carrier acquisition. Such systems are known to the skilled man in the art and will therefore not be described in more detail.) However, at the lower altitudes, the signal received by the second satellite 3 is weak and has large dynamic properties. As such, tracking can not necessarily be performed. Therefore, there is a need for a model-based tracking.

Therefore, the second satellite 3 is provided with an apparatus for performing open loop tracking of a received signal. The apparatus for performing open loop tracking includes means for providing a control signal to a frequency control unit for signal acquisition included in receiving means, arranged on the second satellite 3. The frequency control unit for signal acquisition is of a type known to the skilled in the art and will therefore not be described in further detail. The frequency control unit preferably is arranged as a part of the system for Phase locked loop signal acquisition arranged on the second satellite. The apparatus for performing open loop tracking includes means for receiving information I (x,v) regarding the position and velocity of the first and second satellites. Here x is a 6 dimensional vector containing the positions of both the first satellite 2 and the second satellite 3 and v is a 6 dimensional vector containing the velocities of both the first satellite 2 and the second satellite 3. A coordinate system with origin at the mid point of the Earth is preferably used, but any other coordinate system might be used. The open loop tracking is performed using the information I (x,v) regarding the position and velocity of the first and second satellite in a manner, which is described with reference to FIG. 3.

With reference to FIG. 2, the geometry of a ray path 1 from the first satellite 2 to the second satellite 3 is shown. The ray path follows a first ray asymptote 6 until the ray is bent in the atmosphere, where after it follows a second ray asymptote 7. The first and second ray asymptotes 6,7 cross each other at a refraction angle α. Impact points 8,9 are situated on the ray asymptotes where a plane perpendicularly arranged to a ray asymptote 6,7 passes through the center of the earth. A straight line 10 connects the first satellite 2 and the second satellite 3. The straight-line tangential altitude, SLTA, is defined as the distance between the ellipsoidal tangent point and the straight-line tangent point. The ellipsoidal tangential point is defined as a point on the earth surface where the straight line of sight between the low orbiting satellite and the satellite carrying the transmitter is parallel to the tangent of the surface of the earth and lies in the plane spanned by two satellites and the centre of the earth. The straight-line tangent point is defined as the point of a straight line between the low earth orbiting satellite and the satellite carrying the transmitter that is closest to the ellipsoidal tangent point.

Figure 3:
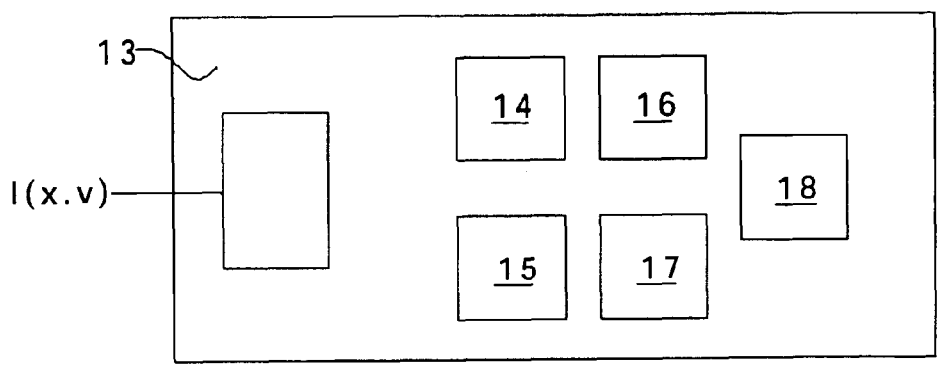
FIG. 3 shows an embodiment of an arrangement for performing a prediction of Doppler shift displacement.

Turning now to FIG. 3, a block diagram of an apparatus 13 for performing open loop tracking of a signal in a radio occultation instrumentation is shown. The apparatus includes means for receiving information I (x,v) regarding the position and velocity of the first and second satellite. The information regarding the position x of the first and second satellite is used as an input to a first functional block 14 of the apparatus 13 for performing closed loop tracking. A second functional block 15 includes a model of the geometry of the earth. For ray path modelling purposes, the model of the earth is defined as the Earth Reference Ellipsoid (ERE) defined in the [WGS84] (World Geodetic System 1984) frame as:

$$R_{earth} = R_{equator} * (1 - f * \sin(lat0 * \pi/180)^2)$$

where $R_{equator} = 6378.137$ km, $f = 0.0033528$ and lat0 is the latitude of the tangent point.

$R_{earth}$ has a local spherical symmetry at lat0. Other models known to those skilled in the art may of course be used.

In first functional block 14, the straight line tangential altitude, SLTA, is calculated from the positions x of the first and the second satellite and information regarding the local radius of the Earth, which is provided by the Earth model in second functional block 15. The straight line tangential altitude, SLTA, is used as input to a third functional block 16 where a calculation of a nominal ray impact altitude, NRIPA, is performed. The nominal ray impact altitude is defined as the distance from the surface of the earth to the impact points 8,9 (FIG. 2). The correspondence between the nominal ray impact altitude, NRIPA, and straight-line tangential altitude, SLTA is defined in a map created from calculations of ray path geometry in a normal atmosphere.

A definition of the correspondence between SLTA and NRIPA is defined as follows.

The critical part of the Doppler model is the computation of NRIPA as a function of SLTA. These two parameters are defined as:

NRIPA: Nominal Ray Impact Point Altitude (above Earth Reference Ellipsoid); and SLTA: Straight Line Tangent Altitude (distance between SLTP and ETP).

The following expression is defined:

$$\text{NRIPA(SLTA)} = \text{MCC} \cdot \text{LOG}_{10} \left( 10^{MIPA/MCC} + 10^{SLTA/MCC} \right) \quad (1)$$

where

Figure 5:
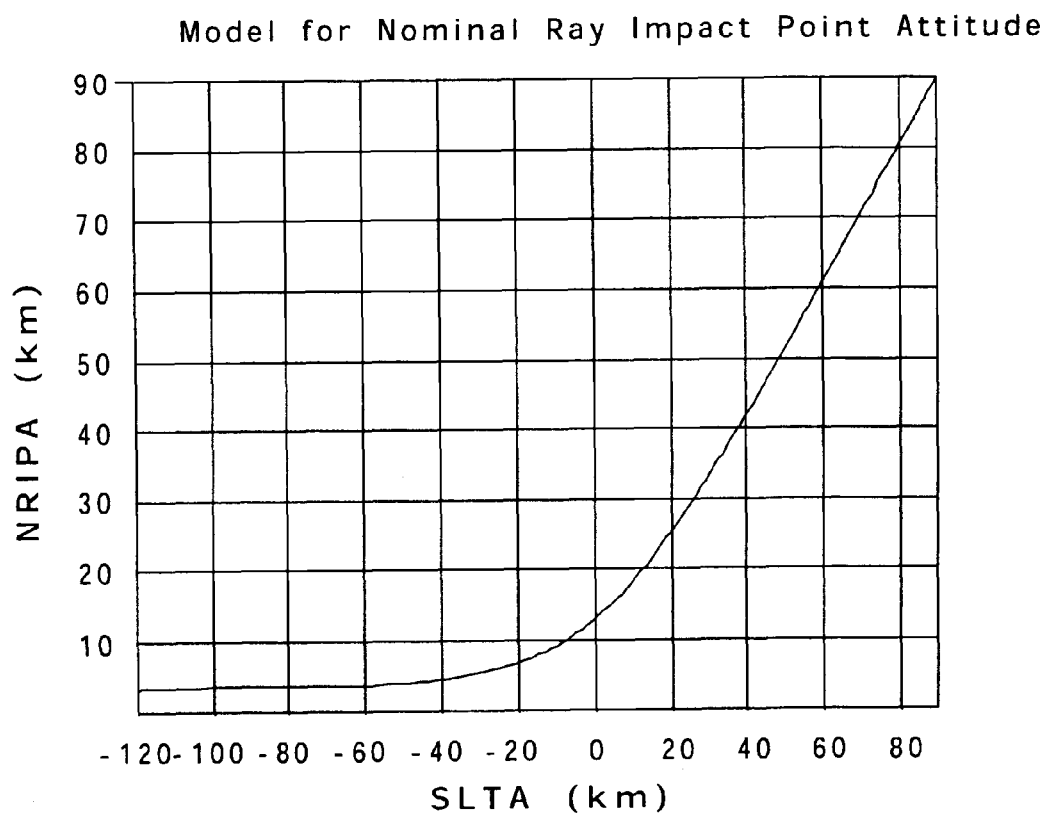
FIG. 5 is a Model for NRIPA as a function of SLTA.

MCC=35 km (Model-Curvature Constant),

MIPA=3.2 km (Minimum Impact Point Altitude), and SLTA and NRIPA are in kilometres. An illustrative plot of NRIPA as a function of SLTA is shown in FIG. 5.

In a fourth functional block 17, of FIG. 3, the nominal ray impact altitude, NRIPA, and the local earth radius, Re are added whereby the distance from the centre of the earth to the impact points 8,9 is calculated. The distance to the impact point a, the positions x of the first and the second satellite and the velocity v of the first and second satellite are used as input parameters to a fifth functional block 18. In the fifth functional block 18, the projection of the Doppler shift displacement in the direction of the ray asymptotes are calculated from the input parameters. The calculated Doppler shift displacement is then transformed to a signal provided to the means for providing a control signal to a frequency control unit for signal acquisition included in the receiving means arranged on the second satellite 3. By using this method of calculation of the Doppler shift displacement, a control signal, which is intended to be transmitted to the frequency control unit, is established which provides a parametric value $Q(x,v,\alpha(x))$ which asymptotically converge towards a function $F(x,v)$ dependent on the satellite positions and velocities and independent of atmosphere conditions when the ray path leaves the atmosphere and asymptotically towards a fixed value when the ray path approaches the surface of the earth. The parametric value is arranged for providing signal acquisition by the frequency control unit.

Figure 4:
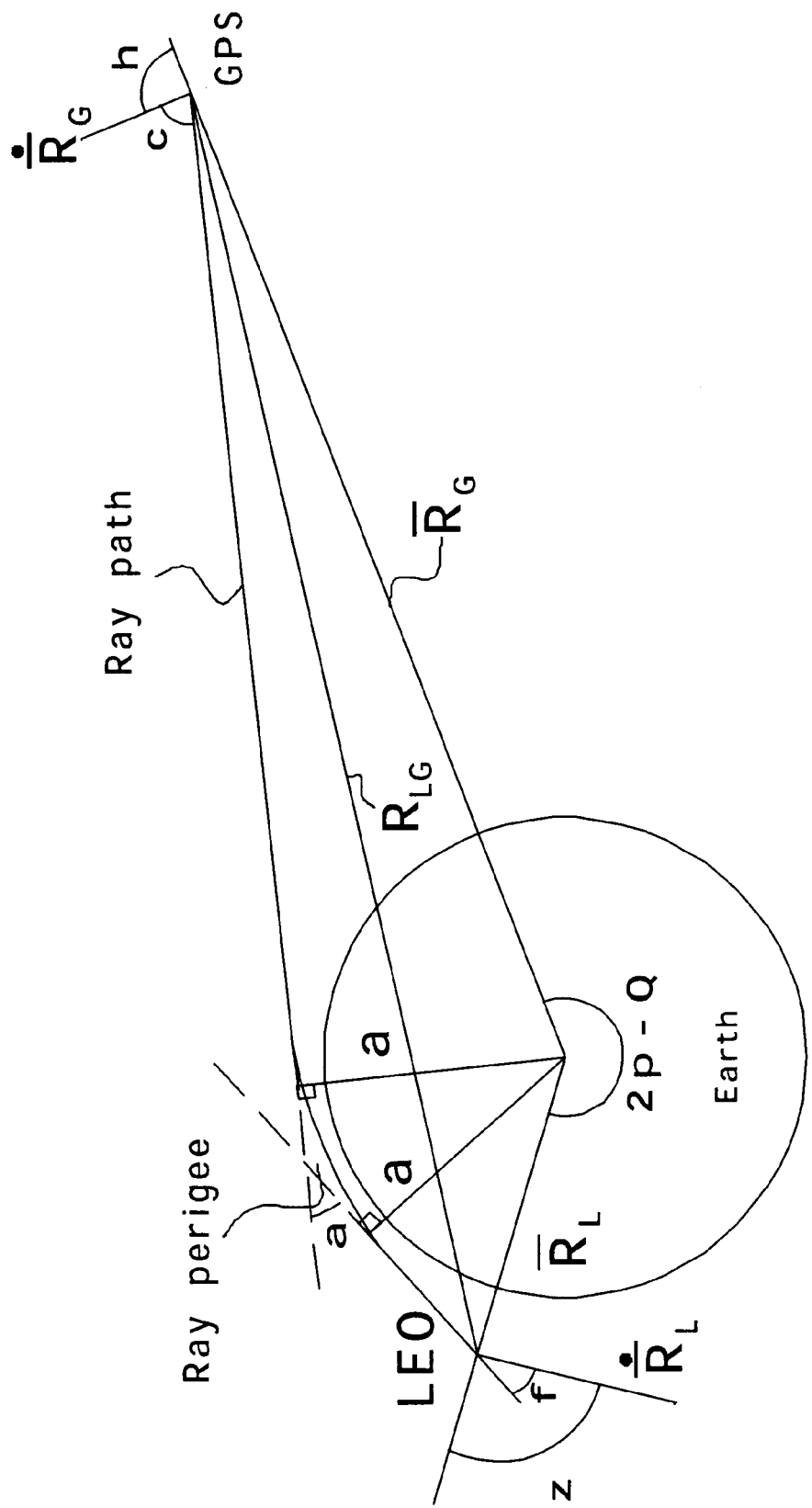
FIG. 4 is ray geometry showing refraction angle and impact parameter.

In the calculation, the following relation between satellite geometry, where circular orbits are assumed for simplicity, impact parameter and Doppler shift is used. (Also, FIG. 4 is ray geometry showing the refraction angle and the impact parameter.)

The phase carrier phase measurement provides the Doppler shift $\Delta f_D$:

$$\frac{\Delta f_D}{f} = \frac{V_L}{c} \cos\varphi_L + \frac{V_G}{c} \cos\varphi_G$$

f measurement frequency, and
c velocity of light.

The Doppler is related to the impact parameter a (assuming spherical symmetry):

$$\lambda \Delta f_D = V_L \frac{a}{R_L} + V_G \frac{a}{R_G}$$

and the bending angle:

$$\alpha = \theta - \cos^{-1}\left(\frac{a}{R_L}\right) - \cos^{-1}\left(\frac{a}{R_G}\right),$$

where $\theta$ is the angular separation between the LEO (Low Earth Orbit) and the GPS satellite.

As described above, the inventive concept provides a prediction of Doppler shift displacement of a transmitted signal in a radio occultation system. Illustratively, a parametric value $Q(x,v,\alpha(x))$ is calculated from information $I(x,v)$ regarding the positions of a first and second satellite 2,3 together with information regarding the local radius of the earth. In a preferred embodiment the parametric value obtains this property by using Nominal ray Impact Altitude as a function of Straight Line Tangential Altitude. The parametric value is transformed to an output signal, which is transmitted to a frequency control unit for performing signal acquisition. Using the parametric value with these properties it is possible to arrange the open loop tracking to adequately follow the phase shift in the low regions and thereby obtain good measurement results. This is due to the fact that even if the atmospheric Doppler is very large at low impact altitudes, the impact altitude asymptotically converges to a constant value at low impact altitudes. The signal acquisition is performed by the signal receiving means where an antenna receives a signal and a down converting circuit down converts the signal received by the antenna with a model controlled frequency generated by a local oscillator included in the frequency control unit using the parametric value. Furthermore, the signal receiving means includes a sampling circuit arranged for sampling the down converted signal with a sampling frequency wide enough to accommodate the bandwidth of the received signal together with the deviation of the center frequency of the received signal and the center frequency of a signal predicted by the parametric value.

Thus, the inventive concept also enables a method for determining atmospheric conditions by performing the steps of:

performing open loop tracking for predicting Doppler shift displacement for tracking a transmitted signal;

collecting phase information from the tracked transmitted signal;

transmitting information regarding the collected transmitted information;

track and extract carrier phase from the collected transmitted information;

receiving information at ground regarding the collected transmitted information; and performing calculations determining atmospheric conditions from the received signal.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Apparatus for performing tracking of a signal in a radio occultation instrumentation system, wherein the signal is transmitted by a first satellite to a second satellite, the apparatus comprising:

means for receiving the signal; and means for providing a prediction of Doppler shift displacement of the received signal based on the geometry of the first and second satellites and earth and on the velocity of the first and second satellites to allow for open loop tracking of the received signal.

2. The apparatus of claim 1, wherein the means for providing provides a parametric value ($Q(x,v,\alpha(x))$), which corresponds to the predicted Doppler Shift displacement, for use in tracking of the received signal.

3. The apparatus of claim 2, wherein the receiving means further includes an antenna arranged for receiving the signal and a down converting circuit arranged for down converting the signal received by the antenna with a model controlled frequency generated by a local oscillator included in a frequency control unit using the parametric value.

4. Apparatus for performing open loop tracking of a signal in a radio occultation instrumentation system, wherein the signal is transmitted by a first satellite to a second satellite, the apparatus comprising:

means for receiving the signal; and means for providing a prediction of Doppler shift displacement of the received signal based on the geometry of the first and second satellites and earth and on the velocity of the first and second satellites, and wherein the means for providing provides a parametric value ($Q(x,v,\alpha(x))$), which corresponds to the predicted Doppler Shift displacement, for use in tracking of the received signal, and wherein the signal has a ray path from the first satellite to the second satellite, wherein the ray path descends into and ascends from the atmosphere and wherein (a) the parametric value ($Q(x,v,\alpha(x))$) asymptotically converges towards a first function ($F(x,v)$) dependent on the satellite positions and velocities and independent of atmosphere conditions when the ray path leaves the atmosphere; and (b) the parametric value ($Q(x,v,\alpha(x))$) asymptotically converge towards a second function ($G(x,v,r)$) dependent of the local earth radius and independent of atmosphere conditions when the ray path approaches the surface of the earth.

5. The apparatus of claim 2, wherein the means for providing includes a means for receiving information ($I(x,v)$) regarding the position, x, and velocity, v, of the first satellite and the second satellite.

6. The apparatus of claim 5, wherein the means for providing determines a position of a nominal ray impact point of a ray path between the first satellite and the second satellite from the information ($I(x,v)$).

7. A method for determining atmospheric conditions from information of Doppler shift displacement in a radio occultation instrumentation system, the method comprising the steps of:

receiving information at ground from a satellite, which collects the information by performing open loop tracking of a transmitted signal from another satellite by predicting Doppler displacement of the transmitted signal; and determining atmospheric conditions from the received information.

8. The apparatus of claim 1 wherein the means for providing include determining atmospheric conditions based on the predicted Doppler Shift displacement.

* * * * *

UNITED STATES PATENT AND TRADEMARK OFFICE
CERTIFICATE OF CORRECTION

PATENT NO. : 6,720,916 B2
DATED : April 13, 2004
INVENTOR(S) : Jacob Christensen et al.

It is certified that error appears in the above-identified patent and that said Letters Patent is hereby corrected as shown below:

Title page,
Item [57], ABSTRACT,
Line 3, "satellite" should read -- satellites --.

Column 1,
Line 12, after "information", delete ",".
Line 21, after "atmosphere", insert -- , --.
Line 27, "radio" should read -- Radio --.
Line 60, after "8.9", insert -- , --.

Column 2,
Line 33, after "While", delete ",".

Column 3,
Line 42, "a" should read -- as --.

Column 5,
Line 32, after "Re", insert -- , --.
Line 39, "are" should read -- is --.
Line 56, after "shift", insert -- , --.

Column 8,
Line 9, "converge" should read -- converges --.
Line 31, "include" should read -- includes --.

Signed and Sealed this

Tenth Day of August, 2004

JON W. DUDAS
*Acting Director of the United States Patent and Trademark Office*